US012674952B2

(12) United States Patent
Jeon et al.

(10) Patent No.: US 12,674,952 B2
(45) Date of Patent: Jul. 7, 2026

(54) LENS ASSEMBLY

(71) Applicant: SAMSUNG ELECTRO-MECHANICS CO., LTD., Suwon-si (KR)

(72) Inventors: Yeo Ok Jeon, Suwon-si (KR); Seok Hwan Kim, Suwon-si (KR); Ho Jae Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 317 days.

(21) Appl. No.: 18/363,975

(22) Filed: Aug. 2, 2023

(65) Prior Publication Data

US 2024/0184078 A1 Jun. 6, 2024

(30) Foreign Application Priority Data

Dec. 2, 2022 (KR) ......................... 10-2022-0166920

(51) Int. Cl.
G02B 7/00 (2021.01)
G02B 7/02 (2021.01)

(52) U.S. Cl.
CPC ............. G02B 7/003 (2013.01); G02B 7/021 (2013.01)

(58) Field of Classification Search
CPC .......... G02B 7/003; G02B 7/021; G02B 7/02; G02B 7/026; G02B 7/022; G02B 13/003; G03B 30/00
See application file for complete search history.

(56) References Cited

U.S. PATENT DOCUMENTS

| | | | |
|---|---|---|---|
| 2014/0029114 A1 | 1/2014 | Kim | |
| 2015/0219871 A1* | 8/2015 | Kim | G02B 7/021 |
| | | | 359/793 |
| 2019/0174032 A1* | 6/2019 | Yang | G06F 1/1686 |
| 2019/0346650 A1* | 11/2019 | Yang | G02B 7/021 |

FOREIGN PATENT DOCUMENTS

| | | |
|---|---|---|
| JP | 2006-030894 A | 2/2006 |
| JP | 2006-195331 A | 7/2006 |
| KR | 10-0951299 B1 | 4/2010 |
| KR | 10-2011-0023575 A | 3/2011 |
| KR | 10-1444526 B1 | 9/2014 |
| KR | 10-2015-0092458 A | 8/2015 |

OTHER PUBLICATIONS

Korean Office Action issued on Dec. 6, 2024 in corresponding Korean Patent Application No. 10-2022-0166920. (7 pages in English and 5 pages in Korean).
Korean Office Action Issued on Jul. 29, 2025, in Counterpart Korean Patent Application No. 10-2022-0166920 (8 Pages in English, 6 Pages in Korean).

* cited by examiner

*Primary Examiner* — Mariam Qureshi
(74) *Attorney, Agent, or Firm* — NSIP Law

(57) ABSTRACT

A lens assembly is provided. The lens assembly includes a lens barrel, at least two lenses arranged inside the lens barrel along an optical axis direction, and a spacer provided between the at least two lenses, wherein the spacer includes a first alignment portion and a second alignment portion seated in respective protrusions or recesses provided on a rib of the first lens and a rib of the second lens.

15 Claims, 10 Drawing Sheets

LENS ASSEMBLY

CROSS-REFERENCE TO RELATED APPLICATIONS

This application claims the benefit under 35 USC § 119(a) of Korean Patent Application No. 10-2022-0166920, filed on Dec. 2, 2022, in the Korean Intellectual Property Office, the entire disclosure of which is incorporated herein by reference for all purposes.

BACKGROUND

1. Field

The following description relates to a lens assembly.

2. Description of Related Art

Recently, camera modules have been used in portable electronic devices, such as, but not limited to, smartphones.

Camera modules are typically provided with a lens assembly including a plurality of lenses. The number of lenses may be increased to improve the performance of camera modules, and the size of camera modules has been reduced.

That is, since the size of camera modules has decreased while the number of lenses has increased, it may be more difficult to align the optical axes of the plurality of lenses.

In the camera module, lenses are sequentially stacked and assembled in a lens barrel in an optical axis direction, and after assembling the lenses, the positions of the plurality of lenses may be displaced due to various factors, which may cause the optical axes of the plurality of lenses to be misaligned, and may degrade the performance of a camera.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens assembly includes a lens barrel; at least two lenses disposed inside the lens barrel along an optical axis direction; and a spacer provided between the at least two lenses, wherein the spacer includes a first alignment portion and a second alignment portion that are seated in respective protrusions or recesses provided on a rib of the first lens and a rib of the second lens.

The rib of the first lens and the rib of the second lens may be disposed on opposite surfaces of the spacer.

The first alignment portion and the second alignment portion may be recesses or protrusions seated in respective protrusions or recesses provided in a first lens and a second lens of the at least two lenses which face the spacer.

The first alignment portion and the second alignment portion may have a recess shape when the rib of the first lens and the rib of the second lens facing each other include protrusions, and when the rib of the first lens and the rib of the second lens include recesses, the first alignment portion and the second alignment portion may have a protrusion shape that fits into the recesses.

At least a portion of the first alignment portion and a portion of the second alignment portion may overlap each other in the optical axis direction.

The first alignment portion and the second alignment portion may not overlap each other in the optical axis direction.

When a virtual circle having a predetermined radius based on the optical axis direction defines a direction along a circumference of the circle as a circumferential direction, the first and second alignment portions may be provided in plural at equal intervals in the circumferential direction.

Four first alignment portions and four second alignment portions may be provided on the spacer.

The recesses or the protrusions which form the first alignment portion and the second alignment portion may have a round shape.

The recesses or the protrusions which form the first alignment portion and the second alignment portion may have a surface shape of a sphere.

The first alignment portion may be provided as a recess or a protrusion, and the second alignment portion may be provided as a recess or a protrusion.

The first alignment portion may be provided as a recess, and the second alignment portion may be provided as a protrusion.

At least portions of the first alignment portion and portions of the second alignment portion may overlap each other in the optical axis direction.

In a general aspect, a lens assembly includes a first lens, a spacer, and a second lens sequentially stacked in an optical axis direction in a lens barrel; a recess-shaped first alignment portion provided in a first rib in which the first lens faces the spacer; a protrusion-shaped second alignment portion fitted into the first alignment portion of the first rib, and provided on a first surface of the spacer opposite to the first rib; a recess-shaped third alignment portion provided on a second surface of the spacer, opposite to the first surface of the spacer, and a protrusion-shaped fourth alignment portion into which the third alignment portion is fitted, and provided on a second rib surface of the second lens facing the spacer.

The first alignment portion, the second alignment portion, the third alignment portion, and the fourth alignment portion may be provided to overlap each other in the optical axis direction.

Edges of recesses or protrusions that form the first alignment portion, the second alignment portion, the third alignment portion, and the fourth alignment portion may have a same shape.

In a general aspect, a lens assembly includes a lens barrel; at least two lenses disposed inside the lens barrel along an optical axis direction; and a spacer provided between the at least two lenses, wherein: a rib of a first lens of the at least two lenses includes a first protrusion that fits into a first recess of the spacer, or a first recess that fits a first protrusion of the spacer, and a rib of a second lens of the at least two lenses includes a second recess that fits a second protrusion of the spacer, or a second protrusion that fits into a second recess of the spacer.

The first protrusion of the rib of the first lens and the second recess of the rib of the second lens may overlap each other in an optical axis direction.

The first protrusion of the rib of the first lens and the second recess of the rib of the second lens may partially overlap each other in an optical axis direction.

The first protrusion of the rib of the first lens and the second recess of the rib of the second lens may not overlap each other in an optical axis direction.

Other features and aspects will be apparent from the following detailed description, the drawings, and the claims.

Figure 1:
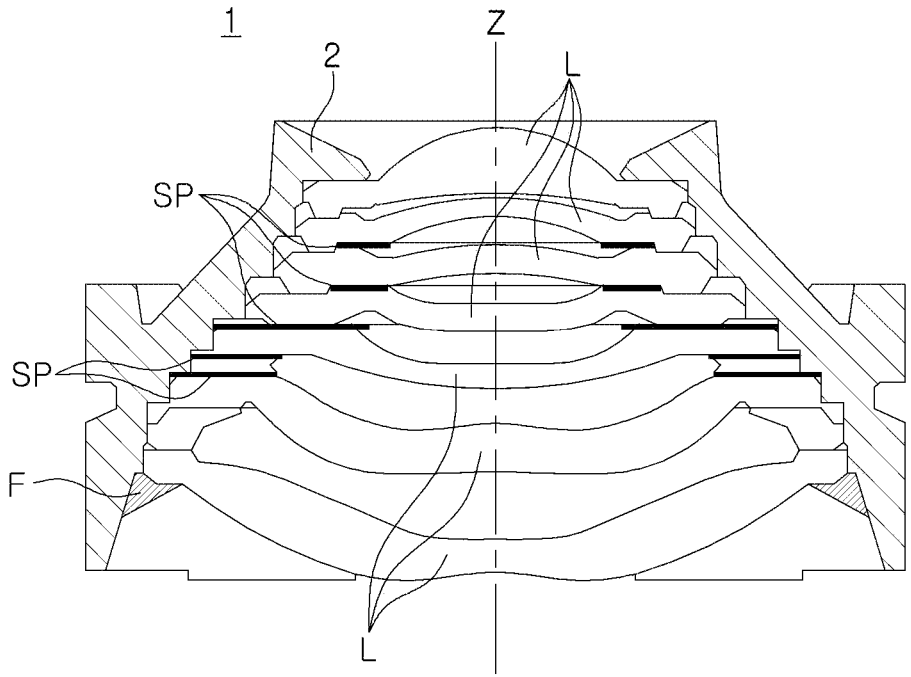
FIG. 1 illustrates a schematic cross-sectional view of an example lens assembly, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples provide a lens assembly that aligns the optical axes of a plurality of lenses, and prevents the displacement of the plurality of lenses.

Figure 2:
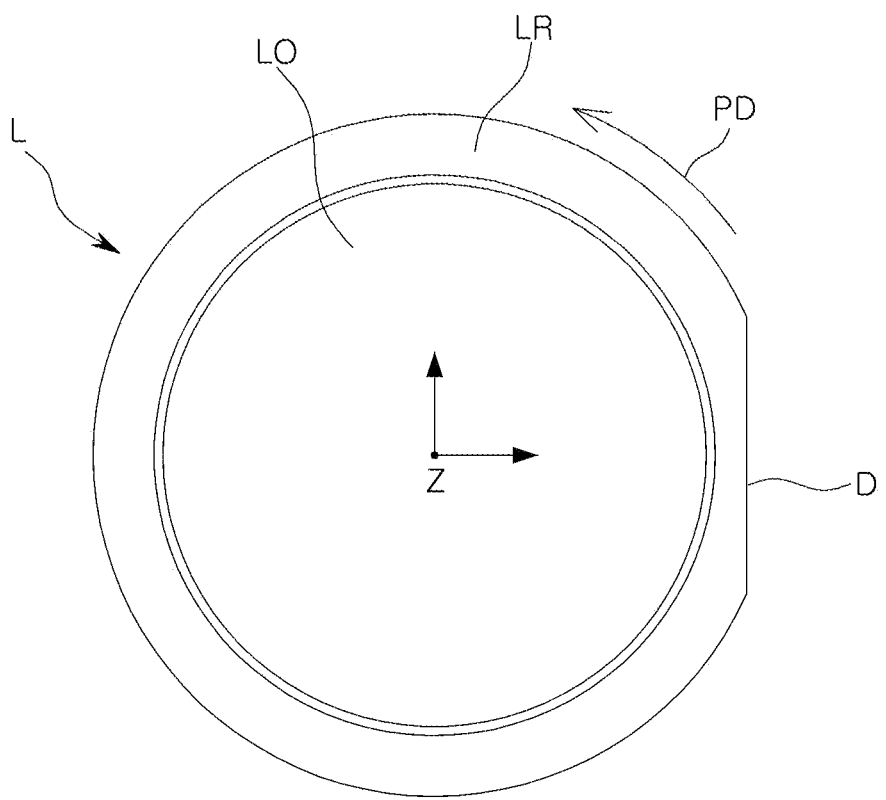
FIG. 2 illustrates a top view of an example lens, in accordance with one or more embodiments.

FIG. 1 illustrates a schematic cross-sectional view of an example lens assembly, in accordance with one or more embodiments, and FIG. 2 illustrates a top view of a lens, in accordance with one or more embodiments.

Referring to FIG. 1, a lens assembly 1, in accordance with one or more embodiments, includes a lens barrel 2 and a plurality of lenses L arranged inside the lens barrel 2. Additionally, a spacer SP may be provided between the lenses L.

Specifically, the lens assembly 1 may include at least two lenses L disposed inside the lens barrel 2 in an optical axis Z and a spacer SP may be provided between the at least two lenses L. In the one or more examples, a structure including seven lenses is presented as an example. However, this is only an example, and a lens assembly including at least two lenses may be included in the one or more embodiments.

Referring to FIG. 2, the lenses L may include an optical portion LO manifesting an optical effect and a rib LR surrounding an edge or outer boundary of the optical portion LO. The optical portion LO may exhibit the optical effect by itself or in combination with a plurality of lenses. The rib LR is not for the optical effect, and may be used to support or align the lenses.

In a non-limited example, the optical portion LO and the rib LR may have a disk shape. Accordingly, the optical portion LO may have a circular shape having a predetermined radius around the optical axis Z, which is a center, and the rib LR may have a ring shape on the outside of the optical portion LO. Additionally, for convenience of description, an edge direction of a circle having a certain radius based on the optical axis Z is defined as a circumferential direction.

The lens L may include a D-cut portion D in which a portion of the rib LR is cut, and the D-cut portion D may have a linear shape.

In an example, the center of the linear D-cut portion D may be provided at the same position as alignment portions 11, 12, 21, 22, 31, and 32 in the circumferential direction. That is, the center of the linear D-cut portion D may overlap the alignment portions 11, 12, 21, 22, 31, and 32 in a radial direction (a radial direction based on the optical axis). Additionally, during assembly of the lens assembly, optimal optical axes may be aligned, while rotating the lens L with respect to the D-cut portion D, for example, by 90 degrees in the example of FIG. 3, by 120 degrees in the example of FIG. 9, and by 60 degrees in the example of FIG. 10.

In an example, a process of assembling the lens assembly 1 by sequentially stacking the plurality of lenses L and the spacer SP in the lens barrel 2 will be briefly described.

The lens barrel 2 includes a narrow portion, i.e., an upper portion in FIG. 1, and an open lower portion, and the lenses L are sequentially fitted through the lower opening. Additionally, since the plurality of lenses L are combined with each other to manifest an optical effect, when assembling the lenses L in the lens barrel 2 sequentially, each of the lenses L may be rotated in the circumferential direction to find an optimal position, and the lenses L are adjusted.

In an example, when assembling the lens L, direction optimization may be performed by rotating the lenses in a direction in which a mechanical error (concentricity/eccentricity) best matches the optical axis. Each lens may be rotated by 90 degrees each time, based on the D-cut D formed at one end of the circular lens in the circumferential direction and assembled at an optimized angle, thereby enabling optimized assembly.

However, if the lens and spacer have a flat structure without a separate alignment portion, there is a possibility that the lens L may move due to vibration and fall after assembly or in the process of using a camera, which may cause a problem of lowering resolution.

Accordingly, in the one or more embodiments, in order to solve this problem, alignment portions may be provided to the lenses L and the spacer SP to facilitate assembly of the lens assembly 1, thereby providing a lens assembly in which distortion of the alignment of the optical axis is minimized even by vibration or shock after assembly.

Figure 3:
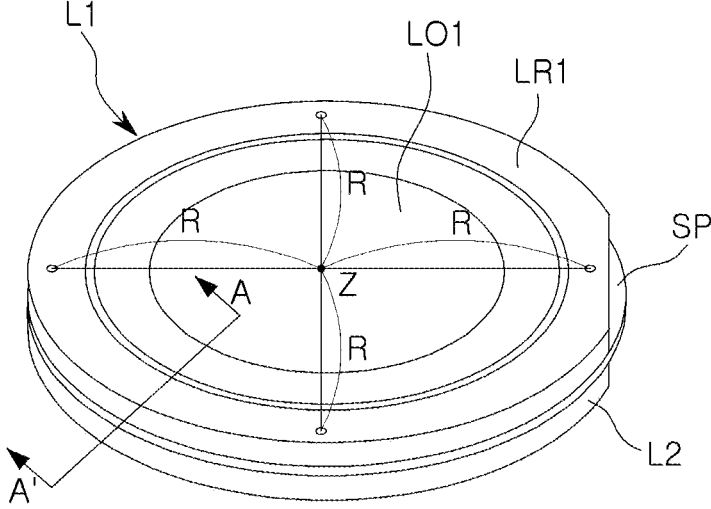
FIG. 3 illustrates a schematic perspective view of a coupling shape of two lenses and a spacer in an example lens assembly, in accordance with one or more embodiments.
Figure 4:
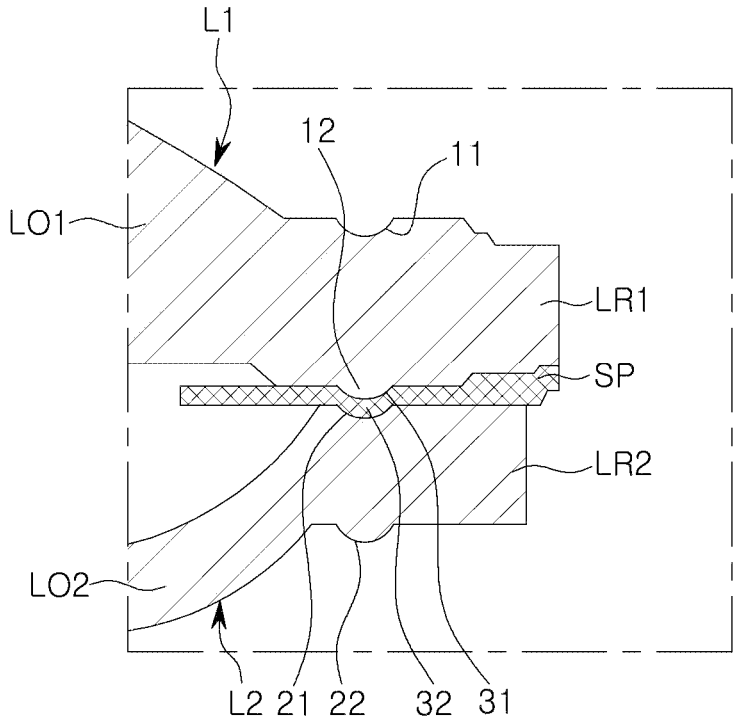
FIG. 4 illustrates a cross-sectional view taken along line A-A' of FIG. 3.
Figure 5:
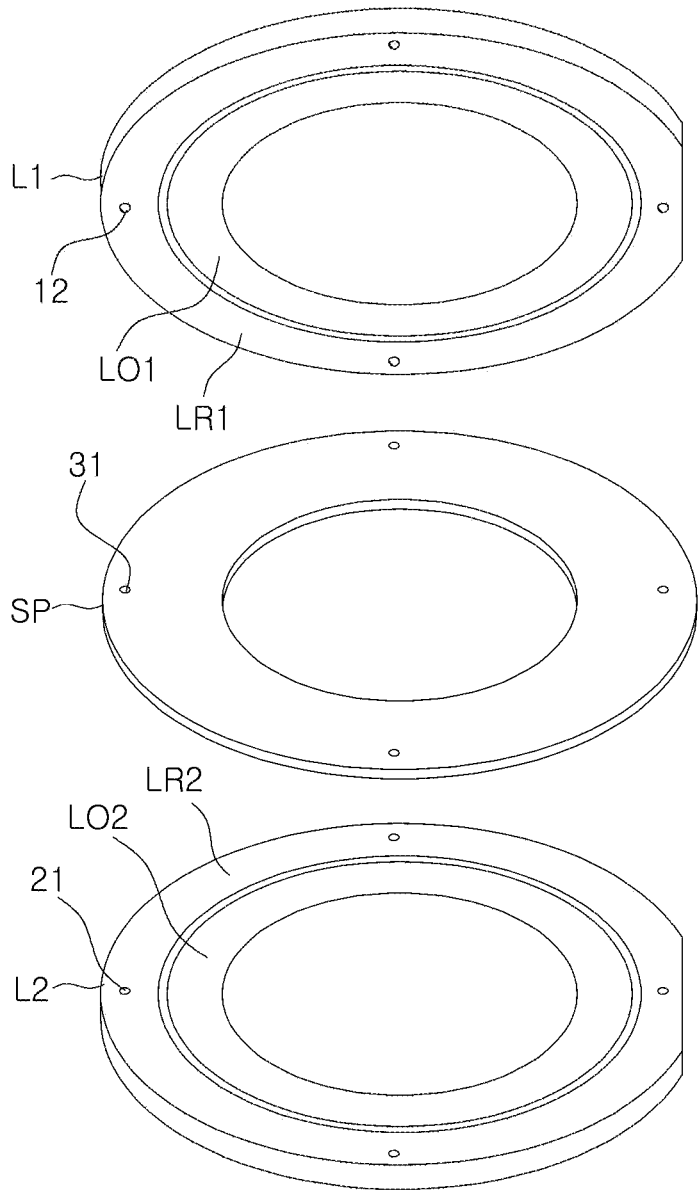
FIG. 5 illustrates an exploded perspective view of two lenses and a spacer in an example lens assembly, in accordance with one or more embodiments.

FIG. 3 is a schematic perspective view illustrating a coupling shape of two lenses and a spacer in an example lens assembly, in accordance with one or more embodiments, FIG. 4 illustrates a cross-sectional view taken along line A-A' of FIG. 3, and FIG. 5 illustrates an exploded perspective view of two lenses and a spacer in an example lens assembly, in accordance with one or more embodiments.

Referring to FIGS. 3 to 5, the spacer SP, in accordance with one or more embodiments, may be provided between a first lens L1 and a second lens L2 disposed in the optical axis direction. The spacer SP may adjust a distance between the lenses or may adjust an amount of light passing through the lenses.

Referring to FIG. 4, the spacer SP may include a 31st alignment portion 31 and a 32nd alignment portion 32 having a protrusion shape or a recess shape on a first surface and a second surface thereof.

Further, in an example, the first lens L1 and the second lens L2 may respectively include 11th, 12th, 21st, and 22nd alignment portions 11, 12, 21, and 22 having a protrusion or recess shape on each of the ribs LR1 and LR2. Among the alignment portions, the 11th and 22nd alignment portions 11 and 22 provided on a surface opposite to the surface facing the spacer SP in the drawing may be seated on alignment portions of other spacers which are not illustrated.

In the one or more embodiments, the spacer SP may include different shapes on a first surface and a second surface thereof, that is, the 31st alignment portion 31 having a recess shape and the 32nd alignment portion 32 having a protrusion shape. Accordingly, the rib LR1 of the first lens L1 facing the 31st alignment portion 31 may be provided with a protrusion-shaped 12th alignment portion 12, and may be seated on the recess-shaped 31st alignment portion. Additionally, the rib LR2 of the second lens L2 facing the 32nd alignment portion 32 may be provided with a recess-shaped 21st alignment portion 21 and may be seated on the protrusion-shaped 32nd alignment portion.

In an example, when the ribs of the first and second lenses L1 and L2, which are members facing each other, include protrusions as the alignment portions 12 and 21, the 31st and 32nd alignment portions 31 and 32 provided in the spacer SP may have a recess shape into which the protrusions are fitted, and when the ribs of the first and second lenses L1 and L2 include recesses as the alignment portions 12 and 21, the 31st and 32nd alignment portions 31 and 32 may have a protrusion shape fitted into the recesses.

Additionally, the 31st alignment portion 31 and the 32nd alignment portion 32 and the 12th alignment portion 12 and the 21st alignment portion 21 seated thereon may have the same edge shape. That is, the edge of the protrusion and the edge of the recess have the same shape so that they may be accurately seated.

In an example, the protrusion-shaped 12th alignment portion 12 seated on the recess-shaped 31st alignment portion 31 may have the same edge, and the protrusion-shaped 32nd alignment portion 32 and the recess-shaped 21st alignment portion 21 may have the same shape and size in the edges.

In an example, for the convenience of the manufacturing process, the edges of the 31st alignment portion 31, the 32nd alignment portion 32, the 12th alignment portion 12, and the 21st alignment portion 21 may all be provided in the same shape. Furthermore, all alignment portions provided in the lenses and spacers provided in the lens assembly 1 may have a recess or protrusion shape, and all edges thereof may be provided in the same shape and size.

In an example, the recesses or protrusions, i.e., the alignment portions, provided in the lens and the spacer in accordance with one or more embodiments, may have a rounded shape or a spherical surface shape.

In an example, the 31st and 32nd alignment portions 31 and 32 may overlap, or may not overlap, in the optical axis direction.

Additionally, as illustrated in FIG. 2, assuming an imaginary circle having a predetermined radius based on the optical axis and defining a direction along the circumference of the aforementioned circle as a circumferential direction PD, the 31st alignment portion 31 or the 32nd alignment portion 32 may be provided in plural to have equal intervals in the circumferential direction.

In the one or more embodiments, in an example, four 31st alignment portions 31 and four 32nd alignment portions 32 may be provided and may be at intervals of 90 degrees in the circumferential direction.

In accordance with one or more embodiments, the 31st alignment portion 31 and the 32nd alignment portion 32 may be provided in different numbers. In a non-limited example, four 31st alignment portions 31 may be provided, and three, five, or six 32nd alignment portions 32 may be provided.

FIG. 6A, FIG. 6B, FIG. 6C, FIG. 7A, FIG. 7B, FIG. 7C, FIG. 8A, FIG. 8B, and FIG. 8C are cross-sectional views illustrating coupling shapes of a spacer and a lens having various modified examples that may be implemented in an example lens assembly, in accordance with one or more embodiments.

Figure 6A:
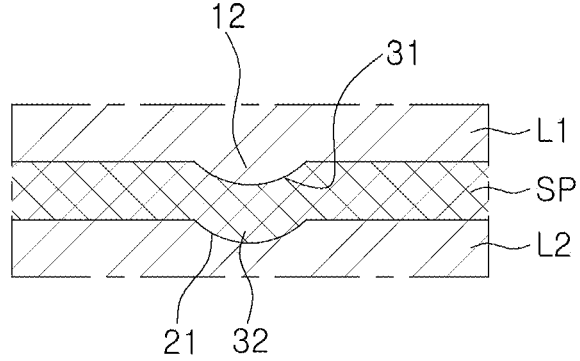
FIG. 6A, FIG. 6B, FIG. 6C, FIG. 7A, FIG. 7B, FIG. 7C, FIG. 8A, FIG. 8B, and FIG. 8C are cross-sectional views illustrating coupling shapes of a spacer and a lens having various modified examples that may be implemented in an example lens assembly, in accordance with one or more embodiments.
Figure 6B:
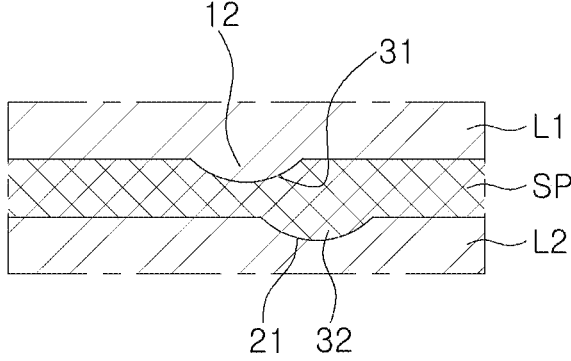
Figure 6C:
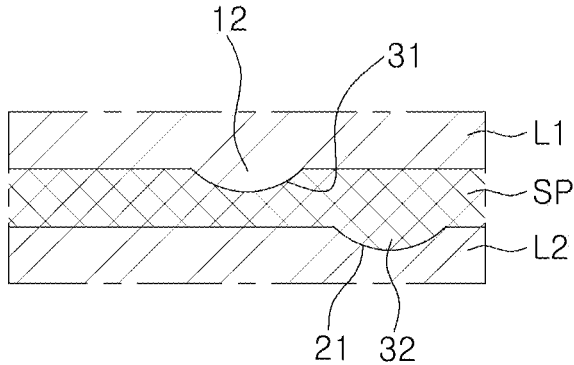

Referring to FIGS. 6A, 6B, and 6C, one of the 31st and 32nd alignment portions 31 and 32 may have a recess shape and the other of the 31st and 32nd alignment portions 31 and 32 may have a protrusion shape.

In this example, the 31st and 32nd alignment portions 31 and 32 may have the same shape and size.

Additionally, in an example, the 31st and 32nd alignment portions 31 and 32 may entirely overlap each other in the optical axis direction (FIG. 6A), and in an example, the 31st and 32nd alignment portions 31 and 32 may partially overlap each other (FIG. 6B), or, in an example, the 31st and 32nd alignment portions 31 and 32 may not overlap each other at all (FIG. 6C).

Figure 7A:
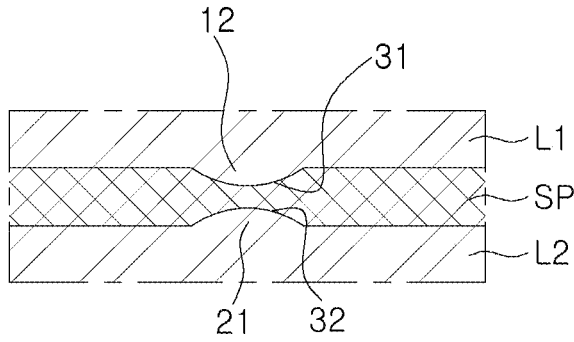
Figure 7B:
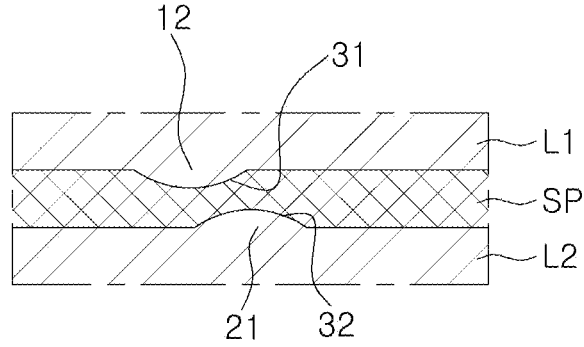
Figure 7C:
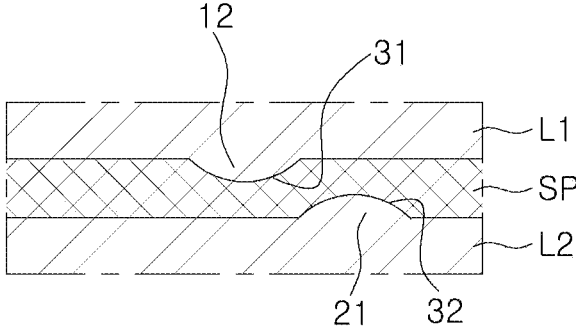

Referring to FIGS. 7A, 7B, and 7C, both the 31st and 32nd alignment portions 31 and 32 may have a recess shape.

In this example, the 31st and 32nd alignment portions 31 and 32 may have the same shape and size.

Additionally, in an example, the 31st and 32nd alignment portions 31 and 32 may entirely overlap each other in the optical axis direction (FIG. 7A), may partially overlap each other in the optical axis direction (FIG. 7B), or may not overlap each other at all (FIG. 7C).

Figure 8A:
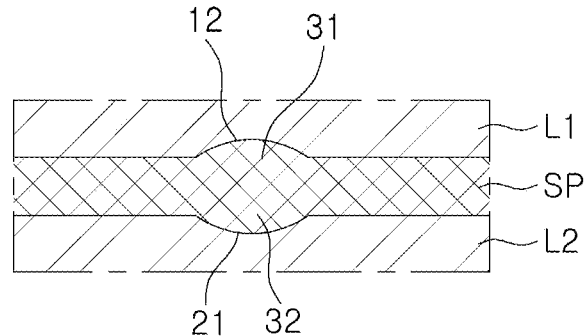
Figure 8B:
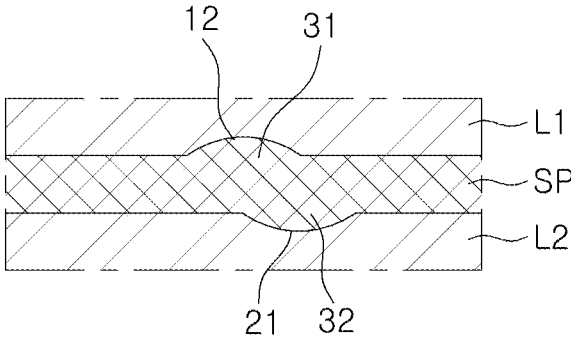
Figure 8C:
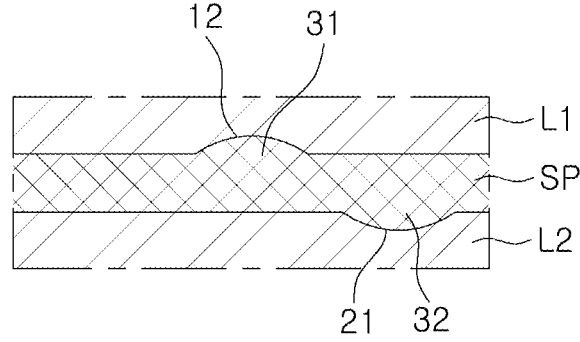

Referring to FIGS. 8A, 8B, and 8C, both the 31st and 32nd alignment portions 31 and 32 may have a protrusion shape.

In this example, the 31st and 32nd alignment portions 31 and 32 may have the same shape and size.

Additionally, the 31st and 32nd alignment portions 31 and 32 may entirely overlap each other in the optical axis direction (FIG. 8A), may partially overlap each other in the optical axis direction (FIG. 8B), or may not overlap each other at all (FIG. 8C).

Figure 9:
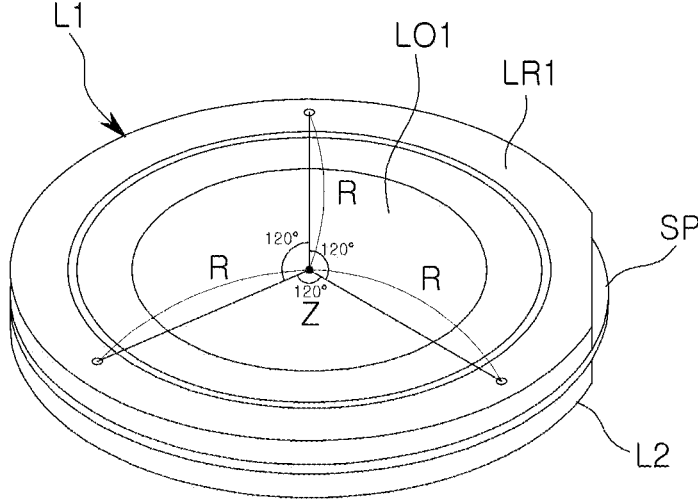
FIG. 9 and FIG. 10 are exploded perspective views illustrating a modified example having a different number of alignment portions provided on one surface of a lens or one surface of a spacer in an example lens assembly, in accordance with one or more embodiments.
Figure 10:
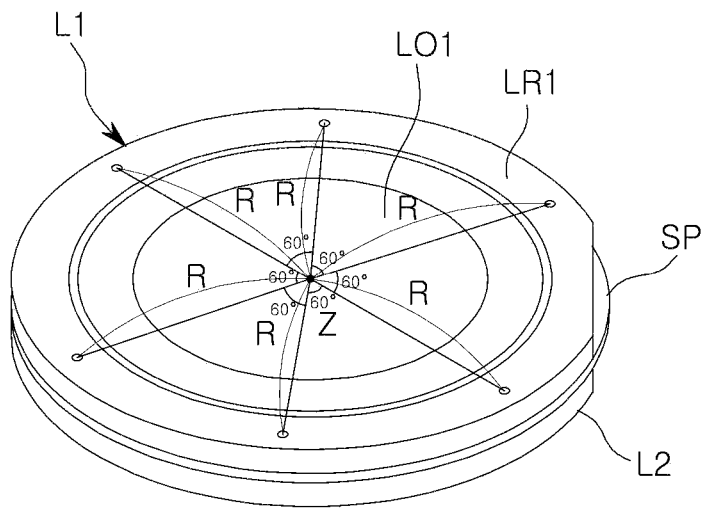

FIGS. 9 and 10 are exploded perspective views illustrating a modified example having a different number of alignment units provided on one surface of a lens or one surface of a spacer in an example lens assembly, in accordance with one or more embodiments.

Referring to FIG. 9, assuming an imaginary circle having a predetermined radius based on the optical axis and defining a direction along the circumference of the aforementioned circle as the circumferential direction PD, the 31st alignment portion 31 or the 32nd alignment portion 32 may be provided in plural to have equal intervals in the circumferential direction, respectively.

Additionally, as illustrated in FIG. 3, a plurality of 31st alignment portions 31 or 32nd alignment portions 32 may be provided in positions having the same radius R on the optical axis. Although FIG. 3 is illustrated based on the lens L1, the same may be equally applied to the example of the spacer SP.

In the one or more embodiments, for example, three 31st alignment portions 31 and three 32nd alignment portions 32 may be provided, which may be provided at intervals of 120 degrees in the circumferential direction.

Although not shown, in an example, the 31st alignment portion 31 and the 32nd alignment portion 32 may be provided in different amounts. For example, three 31st alignment portions 31 may be provided, and four, five, or six 32nd alignment portions 32, etc. may be provided.

Referring to FIG. 10, when a virtual circle having a predetermined radius based on the optical axis defines a direction along the circumference of the aforementioned circle as the circumferential direction PD, the 31st alignment portion 31 or the 32nd alignment portion 32 may be provided in plural to have equal intervals in the circumferential direction.

In an example, six 31st alignment portions 31 and six 32nd alignment portions 32 are provided, which may be provided at intervals of 60 degrees in the circumferential direction.

Although not shown, in an example, the 31st alignment portions 31 and the 32nd alignment portions 32 may be provided in different numbers. For example, three 31st alignment portions 31 may be provided, and three, four, or five 32nd alignment portions 32, etc. may be provided.

The lens assembly 1 of the one or more embodiments may include seven lenses L provided in the lens barrel 2 and six spacers SP provided therebetween. Additionally, after the spacer SP of the one or more embodiments may be assembled to be aligned in the circumferential direction with each lens provided vertically in the optical axis direction, the alignment portions may be provided on the surfaces of the lens and the spacer facing each other to maintain the alignment state. Accordingly, as a result, all lenses and all spacers provided in the lens barrel 2 may be maintained in the aligned state even after assembly.

In an example, the number of lenses L and spacers SP may be variously changed.

The lens assembly according to the one or more embodiments, may easily align the optical axes of a plurality of lenses and prevent the plurality of lenses from being dislocated.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A lens assembly, comprising:
a lens barrel;
a first lens and a second lens disposed inside the lens barrel along an optical axis direction, the first lens comprising a rib having a protrusion and the second lens comprising a rib having a recess; and
a spacer disposed between the first lens and the second lens;
wherein the spacer comprises:
a plurality of first alignment portions disposed on a first surface of the spacer facing the first lens, each first alignment portion having a recess shape recessed toward the second lens,
a plurality of second alignment portions disposed on a second surface of the spacer facing the second lens, each second alignment portion having a protrusion shape protruding toward the second lens,
wherein the protrusion of the rib of the first lens is received in a corresponding one of the first alignment portions, and the recess of the rib of the second lens receives a corresponding one of the second alignment portions,
wherein the first lens comprises a single D-cut portion defined by cutting away a portion of the rib at one circumferential side of the first lens, and
wherein the plurality of first alignment portions and the plurality of second alignment portions are arranged in a circumferential direction with reference to the D-cut portion.

2. The lens assembly of claim 1, wherein the rib of the first lens and the rib of the second lens are disposed on opposite surfaces of the spacer.

3. The lens assembly of claim 1, wherein at least a portion of the first alignment portion and a portion of the second alignment portion overlap each other in the optical axis direction.

4. The lens assembly of claim 1, wherein the first alignment portion and the second alignment portion do not overlap each other in the optical axis direction.

5. The lens assembly of claim 1, wherein the plurality of first alignment portions and the plurality of second alignment portions are disposed at equal intervals in the circumferential direction.

6. The lens assembly of claim 1, wherein four first alignment portions and four second alignment portions are provided on the spacer.

7. The lens assembly of claim 1, wherein the first alignment portion and the second alignment portions each have a round shape.

8. The lens assembly of claim 1, wherein the first alignment portion and the second alignment portions each have a spherical surface shape.

9. A lens assembly, comprising:
a first lens, a spacer, and a second lens sequentially stacked in an optical axis direction in a lens barrel;
a recess-shaped first alignment portion provided in a first rib in which the first lens faces the spacer;
a protrusion-shaped second alignment portion disposed on a first surface of the spacer facing the first rib and received in the first alignment portion;
a recess-shaped third alignment portion disposed on a second surface of the spacer opposite the first surface; and
a protrusion-shaped fourth alignment portion disposed on a second rib of the second lens facing the spacer and received in the third alignment portion,
wherein the first alignment portion receives the second alignment portion, and the third alignment portion receives the fourth alignment portion,
wherein the first lens comprises a single D-cut portion defined by cutting away a portion of the first rib at one circumferential side of the first lens, and
wherein the first to fourth alignment portions are arranged in a circumferential direction with reference to the D-cut portion.

10. The lens assembly of claim 9, wherein
the first alignment portion, the second alignment portion, the third alignment portion, and the fourth alignment portion are provided to overlap each other in the optical axis direction.

11. The lens assembly of claim 9, wherein
edges of recesses or protrusions that form the first alignment portion, the second alignment portion, the third alignment portion, and the fourth alignment portion have a same shape.

12. A lens assembly, comprising:

a lens barrel;

a first lens and a second lens disposed inside the lens barrel along an optical axis direction; and a spacer disposed between the first lens and the second lens, wherein a rib of the first lens comprises a plurality of first protrusions, and the spacer comprises a plurality of first recesses receiving the plurality of first protrusions, wherein a rib of the second lens comprises a plurality of second recesses, and the spacer comprises a plurality of second protrusions received in the plurality of second recesses, wherein the first lens comprises a single D-cut portion defined by cutting away a portion of the rib at one circumferential side of the first lens, and wherein the plurality of first protrusions and the plurality of second recesses are arranged in a circumferential direction with reference to the D-cut portion.

13. The lens assembly of claim 12, wherein the first protrusion of the rib of the first lens and the second recess of the rib of the second lens overlap each other in an optical axis direction.

14. The lens assembly of claim 12, wherein the first protrusion of the rib of the first lens and the second recess of the rib of the second lens partially overlap each other in an optical axis direction.

15. The lens assembly of claim 12, wherein the first protrusion of the rib of the first lens and the second recess of the rib of the second lens do not overlap each other in an optical axis direction.

\* \* \* \* \*